Patented Jan. 6, 1953

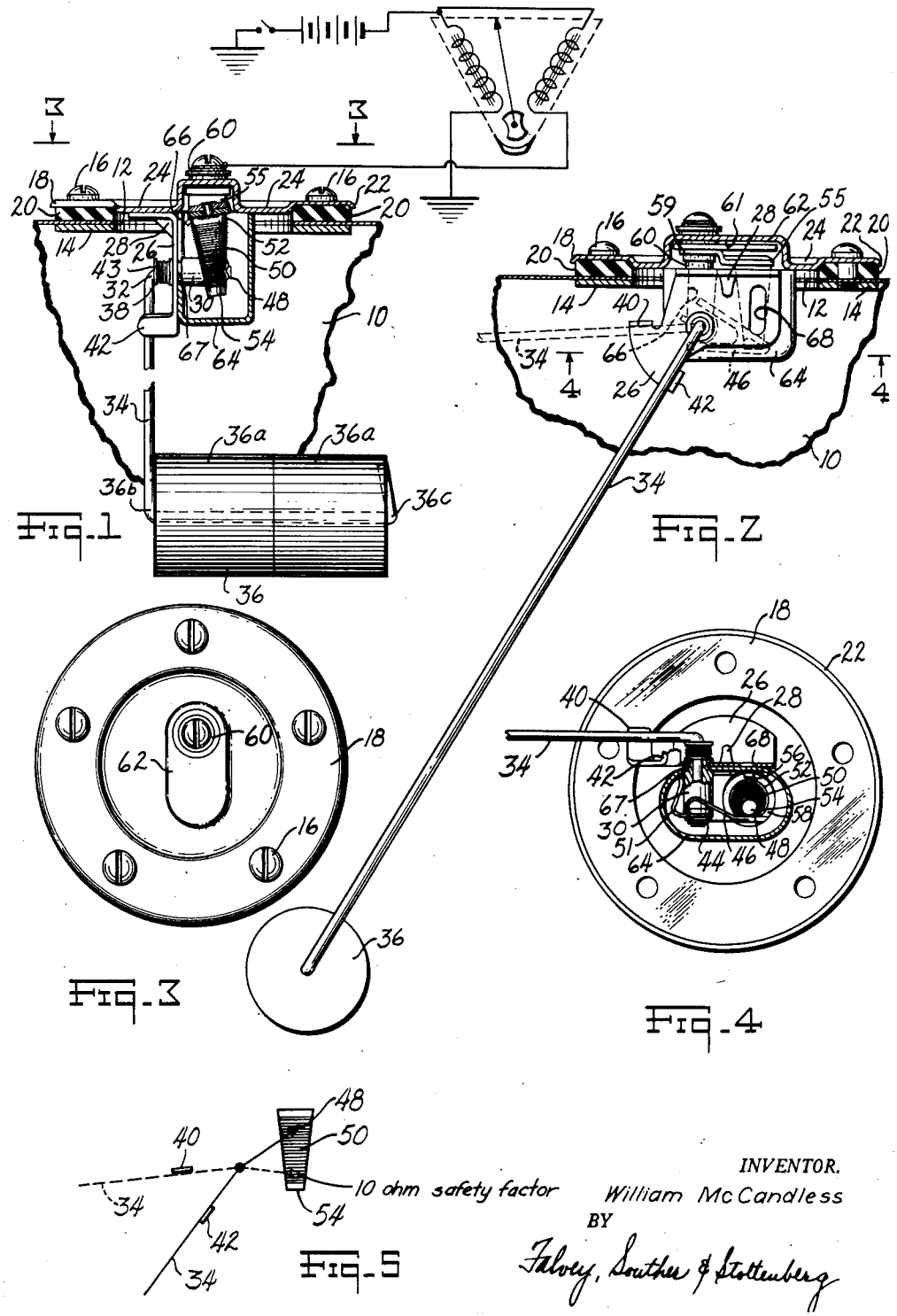

2,624,821

UNITED STATES PATENT OFFICE 2,624,821

TANK HEAD FITTING WITH SAFETY FACTOR

William McCandless, Toledo, Ohio

Application April 28, 1949, Serial No. 90,063

8 Claims. (Cl. 201—48)

1

This invention relates to telemetric devices, more particularly to tank head fittings forming a part of a liquid level measuring device actuating a remote indicating instrument.

In the usual type of rheostatic device used in connection with telemetric devices in tank head fittings in gasoline tanks of automotive vehicles, a flat strip of insulating material was space wound with bare resistance wire, with which a sliding contact means cooperated under control of a float member, whereby the resistance in the telemetric circuit was varied in accordance with the level of the gasoline in the tank. In some cases the contour of the strip was tapered to compensate for unequal deflections for unit variations in the indicating instrument usually at the full end of the scale. This spaced winding of the bare resistance wire in either instance was not reliable in use, in that the sliding contact means tended to stick between the spaced turns, and also that the turns themselves would be displaced by this sticking action to destroy the accuracy of the whole system. Furthermore, this type of resistance unit was difficult to wind with even tension in production which further aggravated the tendency for the turns to become displaced when in use.

In some instances, particularly on a production line, where these telemetric devices were positioned on automotive vehicles, short circuits occurred in the telemetric circuit which placed the full voltage of the energizing battery across the indicating instrument often causing overloading thereof with resulting "burn-outs."

The present invention contemplates the provision of a tank head fitting having a variable resistance for the purposes described which overcomes the disadvantages outlined and at the same time improves these devices from other viewpoints, particularly sealing. It is also contemplated to provide a device constructed so as to facilitate manufacturing control as well as improve its reliability in use on the automobile.

The present invention is an improvement of the telemetric device disclosed in Patent No. 2,423,603 issued July 8, 1947, entitled "Float Operated Rheostat."

It is, therefore, a principal object of this invention to provide a rheostatic device variable in accordance with and by changes in liquid level such as, for example, the fuel tank of an automotive vehicle which operates a telemetric system insluding a remote indicating means.

It is a further object of this invention to provide a tank head fitting for telemetric indicat-

2 ing system, in which a resistance coil is wound on an adjustable conical support with the turns thereof in touching relation so that a contact arm moving over the resistance coil will move smoothly and with minimum frictional resistance.

It is a further object of this invention to provide a tank head fitting for telemetric systems in which a minimum resistance will be maintained in the telemetric circuit when the contact movable over the resistance coil contacts a stop adjacent the low resistance value of the variable resistance to limit the current values flowing in the telemetric circuit to prevent "burning out" of the actuating coil of the indicating head.

It is a further object of this invention to provide a tank head fitting for telemetric systems which will facilitate manufacturing control by ready adjustment and result in a reliable device in use on an automotive vehicle.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Fig. 1 is an elevational view, partly in section, showing the invention in diagrammatic circuit with a telemetric system.

Fig. 2 is also an elevational view.

Fig. 3 is a plan view.

Fig. 4 is a plan view, partly in section, taken along line 4—4 of Fig. 2, and

Fig. 5 is a schematic view showing the relation of the contact stops and the rheostatic coil.

Referring to the drawings, particularly to Fig. 1, a tank 10 is shown which may be the gasoline tank of, for example, an automotive vehicle having an opening 12 on its upper side provided with an inner supporting ring 14, into which are threaded screws 16 holding in position over the opening a supporting plate 18 to which the elements of the present invention are attached in depending portion into the interior of the tank 10. The opening 12 is sufficiently large to allow the whole assembly to be introduced into the tank, and sealed therein by means of a gasket member 20 which is compressed into leak-proof relation between the plate 18 and the top of the tank 10. A gasket seat is formed in the plate 18 between a peripheral depending flange 22 and a central depressed portion 24 between which the gasket is positioned and retained against lateral expansion when compressed so as to improve the seal.

The moving elements of the tank head fitting are supported in depending relation from the lower side of the depression 24 of the plate 18 by means of a bracket 26, preferably spot welded thereto, which may be made more rigid by an oblique portion 28 positioned across the angle. The bracket is provided with a bearing 30 riveted into the depending portion thereof in which is journaled a bent portion 32 of a rod 34 on whose distal end a float means 36 is positioned, which may be a pair of corks 36a held in position on a second bent portion 36b which is again bent over at 36c to hold the corks in position. A collar 38 is provided on the bent portion 32 of the rod 34 so that alignment is retained with a pair of stops 40 and 42 integrally formed as a part of bracket 26 and designed to limit the deflection of the rod 34 by the float means 36. The collar 38 also forms an anchor for a spring 43, whose other end contacts bearing 30. The travel of the rod 34 may, for example, be 55 degrees which is suitable for use with a tank 10 having a depth of 8 inches. The upper stop 40 is designed to stop the rod 34 just before it reaches a horizontal position.

The end of the bent portion 32 is provided with a collar 44, fixedly attached thereto by soldering or the like, to which is riveted a contact arm 46 of spring material such as phosphor bronze. The collar 44 is resiliently held against the end of the bearing 30 by means of the spring 43. The arm is bifurcated adjacent the collar 44 and bent backwardly to form a reverse contour to give a greater effective length, the two arms, however, being integrally joined at the distal end 48 which is given a rounded contour to give a good surface for a sliding contact with a coiled resistance 50 which is mounted on an insulating core or support 52 having the form of a truncated cone. The contact arm 46 is provided with a terminal arm 51 which is bent laterally and inwardly to press with spring tension on the outside surface of the cylinder of the bearing 30 to insure good electrical contact with the bracket 26 which forms a ground connection for the contact arm.

The support 52 is for the resistance 50 preferably molded to a head stud 54, which has a double function of forming a contact means for an extraneous electrical telemetric circuit (Fig. 1) and also mechanically supporting the support 52 on a bendable bracket 55 attached in insulated relation to the plate 18 to be described hereinafter. The head of the stud 54 overhangs the body of the support 52 and forms a shoulder against which the resistance wire is wound so as to prevent the coil formed from sliding off the conical surface. At the start of the winding operation, an end of the resistance wire is fixedly attached to the head in good electrical contact, with the winding preferably being positioned by rotating the support and holding an even tension on the wire. After the predetermined number of turns of wire have been wound in touching relation, the free end thereof is attached to a lug 56 of a washer 58 positioned between the base of the support and the bracket 55 to which the stud is riveted.

The bendable bracket 55, to which the stud 54 is riveted, is provided with a displaced oblique portion 59 which cooperates with a hollow-threaded rivet 60 which forms an electrical terminal for the device and is fastened in insulated relation, as is well known in the art, to the bottom 61 of a boss 62 formed in the plate 18. The oblique relation of the bracket portions mounts the conical coil support 52 in an oblique relation to the plane of the plate 18, so that one side of the resistance coil 50 will be parallel with the depending portion of the bracket 26, which will allow the end 48 of the contact arm 46 to swing an arc with even tension over the bared surface of the resistance wire, which is preferably coated with enamel insulation to segrate the individual turns from each other. The lower end of the resistance coil, by contacting the head 54 of the stud, is by this construction placed in electrical circuit with the terminal rivet 60 and may be connected thereby in the extraneous electrical circuit as shown in Fig. 1.

To protect the electrical elements of the device from the gasoline or the like in the tank 10, a housing 64 is provided having a vertical slot 66 in its side adjacent the bracket 26, which allows the bearing 30 to project into the casing or housing 64 and yet allows the housing to be moved into position so that its lip is in contactual relation with the lower side of the depression 24. If preferred, a shoulder 67 may be provided on the bearing 30 to aid in guiding the housing in position, after which it is soldered in position to the bracket 26 at an aperture 68 which provides a convenient and reliable method of fixing the housing in position, but still allows it to be removed in the event the adjustments are not in accordance with the standard.

Adjustments of the rheostatic device are made during production by bending the bracket 55, which determines the relation of the resistance coil 50 with reference to the pivot of the sliding contact 48. Adjustment is accomplished by setting the sliding contact 48 to a predetermined resistance value at the top of its stroke as determined by the lower stop 42, the contact is then moved to the bottom of its stroke as determined by the upper stop 40, and then the bracket 55 is bent until the correct resistance value is obtained having a relation to the resistance value when in its first upper position.

The relation of the stop 40, the pivot, and the resistance coil 50 (Fig. 5) is arranged in such a manner that when the sliding contact 48 is in its lower position as determined by the stop 40, a predetermined resistance remains in the circuit between the sliding contact 48 and the head 54 of the stud, so as to provide a safety device to prevent damage by a short circuit on the end portion of the coil 50, which would tend to "burn out" if the resistance was so small as to overload the wire in the event it should accidentally be thrown across the battery voltage. This safety resistance may be about 10 ohms, so that the current flow, in the event of full battery voltage is thrown across the end portion of the resistance coil 50, will be small enough to prevent damage.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a device of the class described, a mounting plate having a central depression and a depending peripheral flange to form a gasket seat, a depending bracket attached in normal relation to the lower side of the plate on depressed portion, a conical insulating support having wound thereon a resistance coil, a bracket to mount the conical support to the floor of the depression, said bracket being distortable to allow adjustment of the conical support in transverse planes, terminal means cooperating with the bracket to attach the bracket to the floor and to make electrical contact with an end of the resistance wire whereby the terminal means is enabled to place the resistance in an extraneous electric circuit, said distortable bracket aligning one side of the conical support of the resistance wire in parallel juxtaposition with the bracket, bearing means in the bracket, an arm having a portion journaled in the bearing means, and a grounded contact means attached to the journaled portion to sweep in an arc over the resistance wire on the conical support on the side in parallel relation with the bracket.

2. In a device of the class described, a mounting plate having a central depression and a depending peripheral flange to form a gasket seat, a depending bracket attached in normal relation to the lower side of the plate on depressed portion, a conical insulating support having wound thereon a resistance coil, an obliquely-bent bracket capable of being distorted in transverse planes for adjustment attached to the floor of the depression, terminal means including insulating means cooperating with the obliquely-bent bracket to hold said bracket in insulated relation to the floor and to make electrical contact with an end of the resistance wire whereby the terminal means is enabled to place the resistance in an extraneous electric circuit, said obliquely-bent bracket aligning one side of the conical support of the resistance wire in parallel juxtaposition with the bracket, bearing means in the depending bracket, an arm having a portion journaled in the bearing means, a grounded contact means attached to the journaled portion to sweep in an arc over the resistance wire on the conical support on the side in parallel relation with the bracket, and a housing to enclose the resistance coil and the contact means attached to the depending bracket.

3. In a device of the class described, a mounting plate, a pivoted arm including a float means and a contact means attached to the plate, and an insulated conical support having wound thereon a resistance coil, said support attached to the plate in an oblique position by a bracket bendable in transverse planes for adjustment whereby one side of the cone is in normal relation to the axis of the pivot of the arm to allow the contact means to sweep an arc thereover, the coil of insulated resistance wire wound on the support being bared of insulation on side cooperating with the contact means.

4. In a device of the class described, a mounting plate, a pivoted arm including a float means, a bracket and a contact means attached to the plate carrying bearing means for journalling the pivoted arm, an insulated conical support having wound thereon a resistance coil, said support attached to the plate in an oblique position by an arm bendable in transverse planes for adjustment, whereby one side of the cone is in normal relation to the axis of the pivot of the arm to allow the contact means to sweep an arc thereover, the coil of insulated resistance wire wound on the support being bared of insulation on the side cooperating with the contact means, and a pair of step means carried by said bracket for the pivoted arm to control the sweep thereof about the pivot.

5. In a device of the class described, a mounting plate, a pivoted arm including a float means, a dependent bracket attached to the plate, bearing means in the bracket, the said pivoted arm having a portion journaled in said bearing means, a contact means cooperating with the arm including resilient means to create a contact pressure, an insulated conical support means having wound thereon a resistance coil, said support means fixed to the plate by a bracket in an oblique relation having one side normal to the axis of the pivot of the arm whereby the contact means swings an arc thereover with the resilient means under tension to create a predetermined contact pressure, said bracket being bendable to allow adjustment in transverse planes of the conical support, the coil of insulated resistance wire wound in touching relation on the support being bared of insulation at one side to cooperate with the contact means to complete an electrical circuit therebetween, and terminal means cooperating with an end of the resistance wire to allow the device to be connected in an extraneous electrical circuit.

6. In a device of the class described, a mounting plate, a pivoted arm including a float means, a bracket and a contact means attached to the plate carrying bearing means for journalling the pivoted arm, and insulated conical support having wound thereon a resistance coil, said support attached to the plate in an oblique position by an arm bendable in transverse planes for adjustment, whereby one side of the cone is in normal relation to the axis of the pivot of the arm to allow the contact means to sweep an arc thereover, the coil of insulated resistance wire wound on the support being bared of insulation on the side cooperating with the contact means, and a pair of stop means carried by said bracket for the pivoted arm to control the sweep thereof about the pivot, whereby the contact means maintains a substantial resistance in the circuit at all times.

7. In a device of the class described, a mounting plate, a pivoted arm including a float means, a bracket and a contact means attached to the plate carrying bearing means for journalling the pivoted arm, an insulated conical support having wound thereon a resistance coil, said support attached to the plate in an oblique position by a bendable arm for adjustment, whereby one side of the cone is in normal relation to the axis of the pivot of the arm to allow the contact means to sweep an arc thereover, the coil of insulated resistance wire wound on the support being bared of insulation on the side cooperating with the contact means, and stop means carried by said bracket to cooperate with the pivoted arm to control the sweep contact means over the coil of resistance wire whereby the resistance in the circuit on the low resistance end is never lower than at least 10 ohms.

8. In a device of the class described, a mounting plate, a pivoted arm including a float means, a bracket and a contact means attached to the plate carrying bearing means for journalling the pivoted arm, an insulated conical support having wound thereon a resistance coil, said support attached to the plate in an oblique position by an arm bendable in transverse planes for adjustment, whereby one side of the cone is in normal relation to the axis of the pivot of the arm to allow the contact means to sweep an arc thereover, the coil of insulated resistance wire wound on the support being bared of insulation on the side cooperating with the contact means, and stop means carried by said bracket to cooperate with the pivoted arm to control the sweep contact means over the coil of resistance wire, whereby the contact means at the low resistance end of the coil is stopped with approximately 10 ohms in the circuit.

WILLIAM McCANDLESS.

REFERENCES CITED

The following references are of record in the file of this patent:

UNITED STATES PATENTS

| Number | Name | Date |
|---|---|---|
| 1,285,146 | Harrington | Nov. 19, 1918 |
| 1,610,591 | Redman | Dec. 14, 1926 |
| 2,198,055 | Liner | Apr. 23, 1940 |
| 2,333,406 | Ballard | Nov. 2, 1943 |
| 2,423,603 | McCandless | July 8, 1947 |